Nov. 25, 1952  R. KINNICUTT, JR  2,619,216
CONVEYING APPARATUS
Filed July 21, 1949  2 SHEETS—SHEET 1
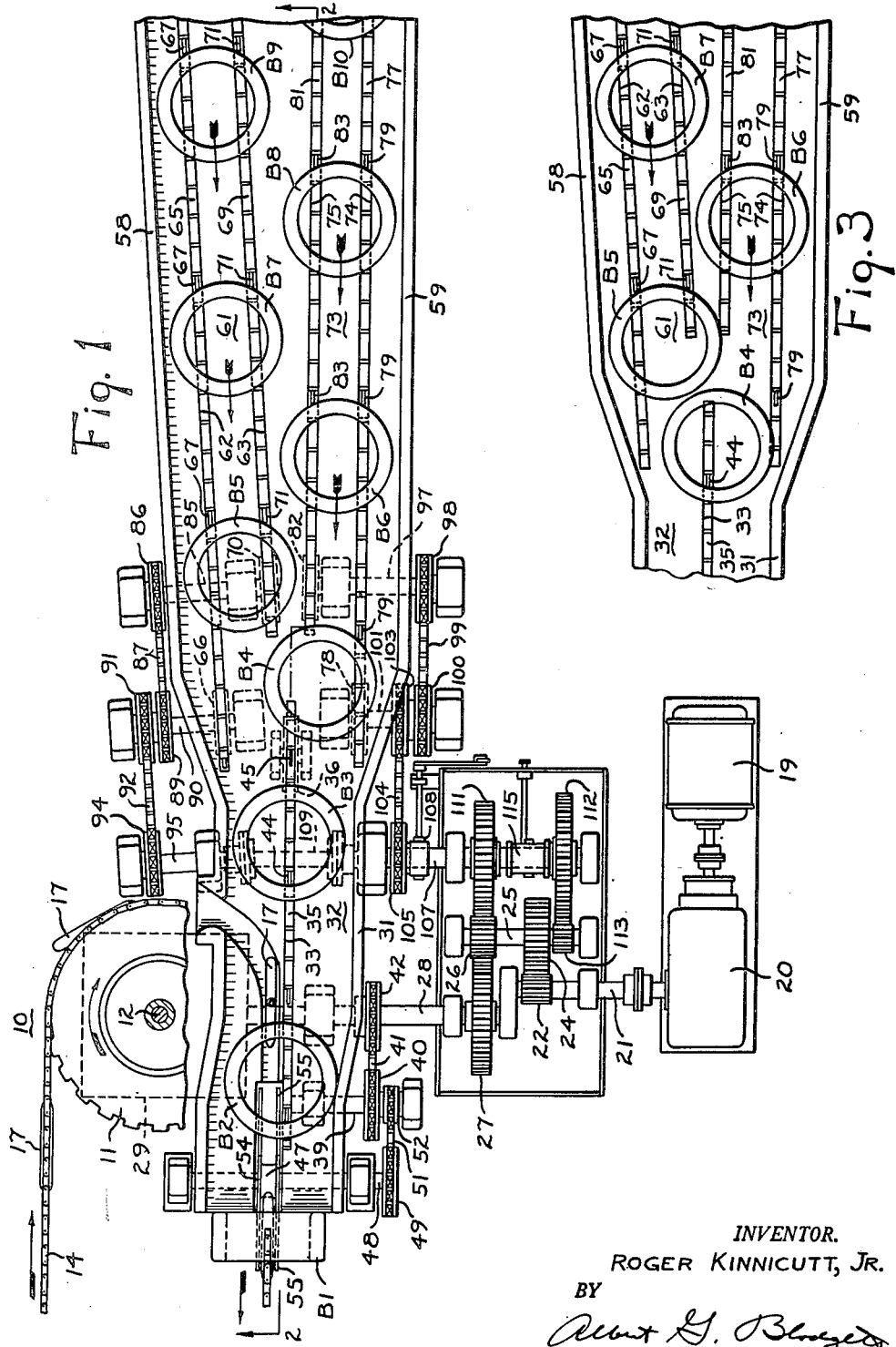
INVENTOR.
ROGER KINNICUTT, JR.
BY
Albert G. Blodgett
ATTORNEY Nov. 25, 1952  R. KINNICUTT, JR  2,619,216
CONVEYING APPARATUS
Filed July 21, 1949  2 SHEETS—SHEET 2
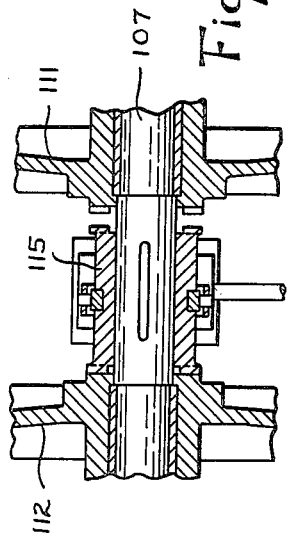
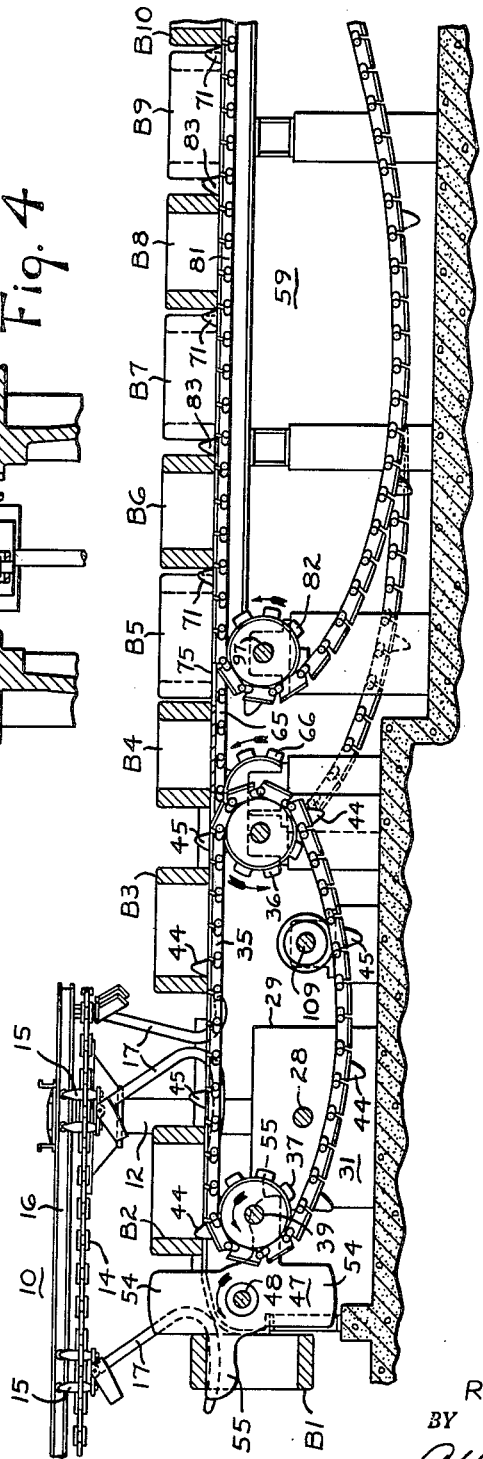
INVENTOR.
ROGER KINNICUTT, JR.
BY
Albert G. Blodgett
ATTORNEY Patented Nov. 25, 1952

2,619,216

UNITED STATES PATENT OFFICE 2,619,216

CONVEYING APPARATUS

Roger Kinnicutt, Jr., Worcester, Mass., assignor to Morgan Construction Company, Worcester, Mass., a corporation of Massachusetts Application July 21, 1949, Serial No. 105,920

7 Claims. (Cl. 198—32)

This invention relates to conveying apparatus, and more particularly to the construction and arrangement of an apparatus including two tributary conveyors which may serve to deliver various articles, such as annular bundles of rolled metal rod or the like, to a single main conveyor.

In rod rolling mills it is the practice to employ reels which coil the rods while they are at a red heat into annular bundles. These bundles are transferred from the reels to a coil conveyor on which they travel along with their axes generally upright. From the coil conveyor the bundles are transferred, by mechanisms of various types, to a "hook carrier" which comprises a series of traveling suspended hooks upon which the bundles are hung with their axes substantially horizontal. The coil conveyor to which the bundles are initially transferred from the reels usually includes a pair of endless parallel chains each having a series of dogs thereon to provide pairs of laterally adjacent dogs which engage the bundles from the rear thereof. The mechanism which transfers the bundles from the double-chain coil conveyor to the hook carrier often includes a single endless chain having a series of dogs thereon, certain of these dogs extending upwardly into the central openings of the bundles to pull them along. In some rolling mills it would be desirable to provide two groups of reels, with a separate coil conveyor for each group to receive bundles therefrom and to convey the bundles for transfer to a single hook carrier. Such an arrangement involves the problem of transferring bundles from two tributary conveyors to a single main conveyor, and so far as I am aware no satisfactory solution to this problem has heretofore been presented.

It is accordingly one object of the invention to provide a comparatively simple and dependable apparatus including two tributary conveyors arranged to deliver annular rod bundles or the like to a single main conveyor.

It is a further object of the invention to provide two tributary conveyors each of the type having a pair of parallel chains provided with dogs for engaging the rear surfaces of annular rod bundles or the like, and a main conveyor with its receiving end located adjacent the discharge ends of the tributary conveyors, the construction and arrangement being such that the bundles will be transferred alternately and automatically from the tributary conveyors to the main conveyor.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a top plan view of a conveying apparatus for annular rod bundles or the like, with certain parts broken away for clearness of illustration;

Fig. 2 is a section taken substantially on the line 2—2 of Fig. 1;

Fig. 3 is a fragmentary view similar to a portion of Fig. 1, but showing the bundles somewhat further advanced in their travel; and Fig. 4 is an enlarged sectional detail of a clutch mechanism.

In the drawings there is shown a portion of a hook carrier 10 comprisng a large sprocket wheel 11 mounted on a vertical shaft 12. A horizontal chain 14 extends around the wheel 11 and is driven thereby. A series of brackets 15 (Fig. 2) are attached to the chain and supported by a horizontal rail 16 thereabove. From each bracket 15 there depends a forwardly directed hook 17. In order to drive the apparatus there is provided an electric motor 19 which is connected by suitable speed-reducing gearing (enclosed within a gear box 20) to a shaft 21 which carries a pinion 22. This pinion meshes with a gear 24 on a shaft 25, this shaft carrying a pinion 26 which meshes with a gear 27 on a shaft 28. The shaft 28 is connected by suitable gearing (enclosed within a gear box 29) to the shaft 12 of the hook carrier.

The bundles are brought to the hook carrier 10 by means of a main conveyor 31 located at one side of the upright shaft 12 and beneath the sprocket wheel 11. The conveyor 31 comprises a substantially horizontal plate 32 having a longitudinally extending slot 33 therein. Beneath this slot there is located an endless chain 35 which travels upwardly around an idler sprocket wheel 36 at the rear or receiving end of the conveyor and downwardly around a driving sprocket wheel 37 near the front or discharge end of the conveyor. The wheel 37 is mounted on a shaft 39 which carries a sprocket wheel 40, the wheel 40 being connected by a chain 41 to a sprocket wheel 42 mounted on the shaft 28. By this means the sprocket wheel 37 is driven and the upper run of the chain 35 is moved forwardly. This chain carries a series of dogs 44 and 45 which extend upwardly through the slot 33. The dogs 44, which may be called pulling dogs, alternate with the dogs 45, which may be called pusher dogs. The annular coils or bundles of rods are supported upon the plate structure 32 with their axes generally upright and with the pulling dogs 44 extending into the interiors of the bundles to pull them along. As each pulling dog passes downwardly around the front sprocket wheel 37, the movement of the corresponding bundle will cease momentarily until the next pusher dog 45 engages the rear surface of the bundle to push it forwardly.

The bundles are transferred from the main conveyor 31 to the hooks 17 by a transfer wheel 47 located close to one side of the front sprocket wheel 37 and slightly in front thereof. This transfer wheel is mounted on a transverse horizontal shaft 48 having a sprocket wheel 49 mounted thereon, the wheel 49 being connected by a chain 51 to a sprocket wheel 52 mounted on the shaft 39. The transfer wheel 47 is provided with two opposed generally radial arms 54 which alternate with two opposed arms 55. The arms 54 and 55 are each of a dual construction, as best seen in Fig. 1, with two laterally spaced parts between which the hooks 17 may travel. As each bundle approaches the transfer wheel 47, one of the arms 55 will move upwardly into the interior of the bundle, and the bundle will be carried forwardly and downwardly until its axis is substantially horizontal and one of the hooks 17 has passed through its interior, as shown in the case of the bundle B1, to remove it from the arm 55. The apparatus as so far described is disclosed and claimed in a prior application of Young and Kinnicutt, Serial No. 88,712, filed April 21, 1949.

The rod bundles are delivered to the main conveyor 31 by two tributary conveyors 58 and 59. These tributary conveyors may be parallel with one another or they may converge at an angle as shown, but in any event their discharge portions are laterally adjacent to one another and adjacent to the receiving end of the main conveyor 31.

The conveyor 58 comprises a substantially horizontal plate 61 having two longitudinally extending parallel slots 62 and 63 therein located on opposite sides of the conveyor center line. Beneath the outer slot 62 there is provided an endless chain 65 which extends downwardly around a driving sprocket wheel 66 near the front or discharge end of the conveyor. The chain carries a series of dogs 67 which project upwardly through the slot 62. Beneath the inner slot 63 there is provided an endless chain 69 which extends downwardly around a driving sprocket wheel 70 somewhat anterior to the discharge end of the conveyor. This chain carries a series of dogs 71 which project upwardly through the slot 63. The dogs 67 and 71 are arranged in pairs of laterally adjacent dogs, each pair of dogs being adapted to engage the rear surface of a bundle and to advance the same along the conveyor.

The conveyor 59 comprises a substantially horizontal plate 73, which for simplicity of illustration is shown as integral with the plate 61. This plate 73 has two longitudinally extending parallel slots 74 and 75 therein located on opposite sides of the conveyor center line. Beneath the outer slot 74 there is provided an endless chain 77 which extends downwardly around a driving sprocket wheel 78 near the front or discharge end of the conveyor. This chain carries a series of dogs 79 which project upwardly through the slot 74. Beneath the inner slot 75 there is provided an endless chain 81 which extends downwardly around a driving sprocket wheel 82 somewhat anterior to the discharge end of the conveyor and laterally adjacent to the wheel 70. This chain carries a series of dogs 83 which project upwardly through the slot 75. The dogs 79 and 83 are arranged in pairs of laterally adjacent dogs, each pair of dogs being adapted to engage the rear surface of a bundle and to advance the same along the conveyor.

The two tributary conveyors are arranged to deliver bundles alternately to the main conveyor 31. For this purpose the dogs 67—71 of the conveyor 58 are staggered with respect to the dogs 79—83 of the conveyor 59. Furthermore, since the inner dogs 71 and 83 are withdrawn downwardly and out of contact with the bundles somewhat before the bundles reach the discharge ends of the respective tributary conveyors, the outer dogs 67 and 79 will move the bundles with a laterally inward component into positions above the rear portion of the main conveyor slot 33, so that the pulling dogs 44 of the main conveyor may move upwardly into the interiors of the bundles. In order to ensure the desired laterally inward movement of the bundles, the bundles should rest on the conveyor plates 61—73 rather than on the outer chains 65—77 adjacent the discharge ends of the tributary conveyors, and for this reason the chains should not project above the plates in these portions of the conveyors. It will be noted that the sprocket wheels 66 and 78 which drive the outer chains of the tributary conveyors 58 and 59 respectively are located on opposite sides of the rear or idler sprocket wheel 36 of the main conveyor 31. The sprocket wheels 70 and 82 which drive the inner chains of the tributary conveyors 58 and 59 respectively are located an appreciable distance to the rear of the idler sprocket wheel 36. Hence the inner chain dogs 71 and 83 will be withdrawn downwardly in ample time to permit the desired inward movements of the bundles under the influence of the outer chain dogs 67 and 79.

The two tributary conveyors 58 and 59 are driven in a predetermined speed relationship to the main conveyor 31. For this purpose the inner sprocket wheel 70 is mounted on a shaft 85 which carries a sprocket wheel 86, the latter being connected by a chain 87 to a sprocket wheel 89 on a shaft 90. This shaft 90 supports the sprocket wheel 66 and in addition it carries a sprocket wheel 91 which is connected by a chain 92 to a sprocket wheel 94 on a shaft 95 in front of the shaft 90. Similarly, the inner sprocket wheel 82 is mounted on a shaft 97 which carries a sprocket wheel 98, the latter being connected by a chain 99 to a sprocket wheel 100 on a shaft 101. This shaft 101 supports the sprocket wheel 78 and in addition it carries a sprocket wheel 103 which is connected by a chain 104 to a sprocket wheel 105 on a shaft 107 in front of the shaft 101. The wheel 105 is connected to the shaft 107 by means of a manually operable clutch 108. A universal spindle 109 connects the shaft 95 to the shaft 107. The latter shaft carries a gear 111 which meshes with the pinion 26 on the shaft 25 and it also carries a gear 112 which meshes with a second pinion 113 on the shaft 25. The gears 111 and 112 are free on the shaft 107 but can be selectively clutched thereto by a manually operable member 115 which is slidably keyed to the shaft between the gears, as best shown in Fig. 4.

The operation of the invention will now be apparent from the above disclosure. Normally both the tributary conveyors 58 and 59 will be in service to convey bundles B1, B2, B3, B4, etc. or the like from two different sources, such as two groups of reels (not shown). Under these conditions the sprocket wheel 105 and the gear 112 will both be clutched to the shaft 107. With this shaft driven by the pinion 113 and the gear 112, the relationship between the speed of the main conveyor chain 35 and the speed of the tributary conveyor chains 65, 69, 77 and 81 will be such that with both the tributary conveyors filled to capacity with bundles, the pulling dogs 44 will move along just fast enough to receive these bundles as they are delivered by the two tributary conveyors alternately. If the distance between successive pulling dogs 44 is the same as the distance between sucessive dogs on each tributary conveyor, the speed of the main conveyor chain should be twice that of the tributary conveyor chains. So long as a bundle is engaged by two dogs 67—71 or 79—83, as the case may be, it will travel directly along the center line of the corresponding tributary conveyor. When one of the inner dogs 71 or 83 moves downwardly around its corresponding driving sprocket wheel 70 or 82, it will be withdrawn from contact with its bundle, and the corresponding outer dog 67 or 79 will continue to advance the bundle. However, since such outer dog is displaced outwardly from the center line of the conveyor, it will push the bundle inwardly as well as forwardly. For example, in Fig. 1 the bundle B4 is being moved solely by one of the outer dogs 79, the corresponding inner dog having moved downwardly around the sprocket wheel 82. Consequently this bundle B4 has already been moved laterally to a considerable extent under the influence of the dog 79. In Fig. 3 the bundle B4 has moved still further inwardly, and one of the main conveyor dogs 44 has moved upwardly into the interior of the bundle and pulled the bundle forwardly out of contact with the dog 79. In a similar manner, additional bundles will be delivered to the successive dogs 44 by the tributary conveyors 58 and 59 alternately so that the bundles will merge into a single line on the main conveyor 31. As each bundle approaches the transfer wheel 47, and the corresponding pulling dog 44 passes downwardly around the sprocket wheel 37, the following pusher dog 45 will move into contact with the rear surface of the bundle and push it forwardly. At this time one of the arms 55 of the transfer wheel will move upwardly into the interior of the bundle to swing the bundle forwardly and downwardly, whereupon one of the hooks 17 will pass through the bundle and remove it from the transfer wheel.

If now the reels or other apparatus which supply rod bundles to the tributary conveyor 59 are for any reason not in use, it is unnecessary to operate this conveyor, and it can be stopped by disengaging the clutch 108, so that the sprocket wheel 105 will no longer be driven by the shaft 107. Under these circumstances the operator will shift the clutch 115 to the position opposite that indicated in Figs. 1 and 4, thereby disconnecting the shaft 107 from the gear 112 and connecting it to the gear 111 instead. The ratio of the number of teeth on the gear 112 to the number of teeth on the pinion 113 is twice the ratio of the number of teeth on the gear 111 to the number of teeth on the pinion 26. Consequently, shifting the clutch 115 as described above will double the ratio of the speed of the tributary conveyor 58 to the speed of the main conveyor 31, and if the one tributary conveyor is filled to capacity with bundles this will likewise be true of the main conveyor.

Having thus described my invention, what I claim as new and desire to secure by Letters Patent is:

1. Conveying apparatus for articles comprising two tributary conveyors each including a row of dogs movable along the conveyor and adapted to engage articles and to advance the same along the conveyor, the discharge portions of the conveyors being laterally adjacent and the dogs on one conveyor being staggered with respect to the dogs on the other conveyor, and a main conveyor in position to receive articles as they are delivered by the two tributary conveyors alternately and to move the articles forwardly in a single line in the same general direction.

2. Conveying apparatus for articles comprising two tributary conveyors each including two parallel rows of upwardly projecting dogs arranged in pairs of laterally adjacent dogs, each pair of dogs being adapted to engage the rear surface of an article and to advance the same along the conveyor, the discharge portions of the conveyors being laterally adjacent and the dogs on one conveyor being staggered with respect to the dogs on the other conveyor, and a main conveyor in position to receive articles as they are delivered by the two tributary conveyors alternately.

3. Conveying apparatus for articles comprising two tributary conveyors with their discharge portions laterally adjacent and each conveyor including two parallel rows of upwardly projecting dogs arranged in pairs of laterally adjacent dogs, each pair of dogs being adapted to engage the rear surface of an article and to advance the same along the conveyor, the dogs on one conveyor being staggered with respect to the dogs on the other conveyor, means to withdraw the inner dog in each pair out of contact with the corresponding article as the article nears the discharge end of the conveyor and thereby cause the corresponding outer dog to move the article with a laterally inward component, and a main conveyor in position to receive articles as they are delivered by the two tributary conveyors alternately.

4. Conveying apparatus for articles comprising two tributary conveyors with their discharge portions laterally adjacent and each conveyor including two parallel chains with a row of upwardly projecting dogs on each chain, the dogs on each conveyor being arranged in pairs of laterally adjacent dogs, each pair of dogs being adapted to engage the rear surface of an article and to advance the same along the conveyor, the dogs on one conveyor being staggered with respect to the dogs on the other conveyor, means guiding each of the two outer chains downwardly adjacent the discharge ends of the conveyors, means guiding each of the two inner chains downwardly somewhat anterior to the discharge ends of the conveyors to withdraw each inner dog in succession out of engagement with its article while the corresponding outer dog remains in engagement with the article to push it forwardly and laterally inwardly, and a main conveyor in position to receive articles as they are delivered by the two tributary conveyors alternately.

5. Conveying apparatus for articles comprising two tributary conveyors with their discharge portions laterally adjacent and each conveyor including two parallel chains with a row of upwardly projecting dogs on each chain, the dogs on each conveyor being arranged in pairs of laterally adjacent dogs, each pair of dogs being adapted to engage the rear surface of an article and to advance the same along the conveyor, the dogs on one conveyor being staggered with respect to the dogs on the other conveyor, a separate driving sprocket wheel for each of the two outer chains to guide the chains downwardly adjacent the discharge ends of the conveyors, a separate driving sprocket wheel for each of the two inner chains to guide the chains downwardly somewhat anterior to the discharge ends of the conveyors to withdraw each inner dog in succession out of engagement with its article while the corresponding outer dog remains in engagement with the article to push it forwardly and laterally inwardly, and a main conveyor in position to receive articles as they are delivered by the two tributary conveyors alternately.

6. Conveying apparatus for annular articles comprising two tributary conveyors with their discharge portions laterally adjacent and each conveyor including two parallel chains with a row of upwardly projecting dogs on each chain, the dogs on each conveyor being arranged in pairs of laterally adjacent dogs, each pair of dogs being adapted to engage the rear surface of an article and to advance the same along the conveyor, the dogs on one conveyor being staggered with respect to the dogs on the other conveyor, a separate driving sprocket wheel for each of the two outer chains to guide the chains downwardly adjacent the discharge ends of the conveyors, a separate driving sprocket wheel for each of the two inner chains to guide the chains downwardly somewhat anterior to the discharge ends of the conveyors to withdraw each inner dog in succession out of engagement with its article while the corresponding outer dog remains in engagement with the article to push it forwardly and laterally inwardly, and a main conveyor in position to receive articles as they are delivered by the two tributary conveyors alternately, the main conveyor including a chain with a row of dogs thereon, the main conveyor dogs being arranged to move upwardly into the interiors of the bundles and then to pull the bundles forwardly.

7. Conveying apparatus as set forth in claim 6, in which the main conveyor chain travels upwardly around an idler wheel adjacent its rear or receiving end, the two driving sprocket wheels for the outer chains are located on opposite sides of the said idler wheel, and the two driving sprocket wheels for the inner chains are located an appreciable distance to the rear of the said idler wheel.

ROGER KINNICUTT, Jr.

REFERENCES CITED

The following references are of record in the file of this patent:

UNITED STATES PATENTS

| Number | Name | Date |
| --- | --- | --- |
| 1,906,605 | Hutchinson | May 2, 1933 |
| 2,108,522 | Bergmann | Feb. 15, 1938 |
| 2,139,877 | Brandt | Dec. 13, 1938 |
| 2,181,211 | Sieg | Nov. 28, 1939 |
| 2,535,859 | McPherson | Dec. 26, 1950 |